Oct. 7, 1969 J. M. GOPPEL 3,470,595
PRODUCTION OF STAPLE FIBERS
Filed July 28, 1967
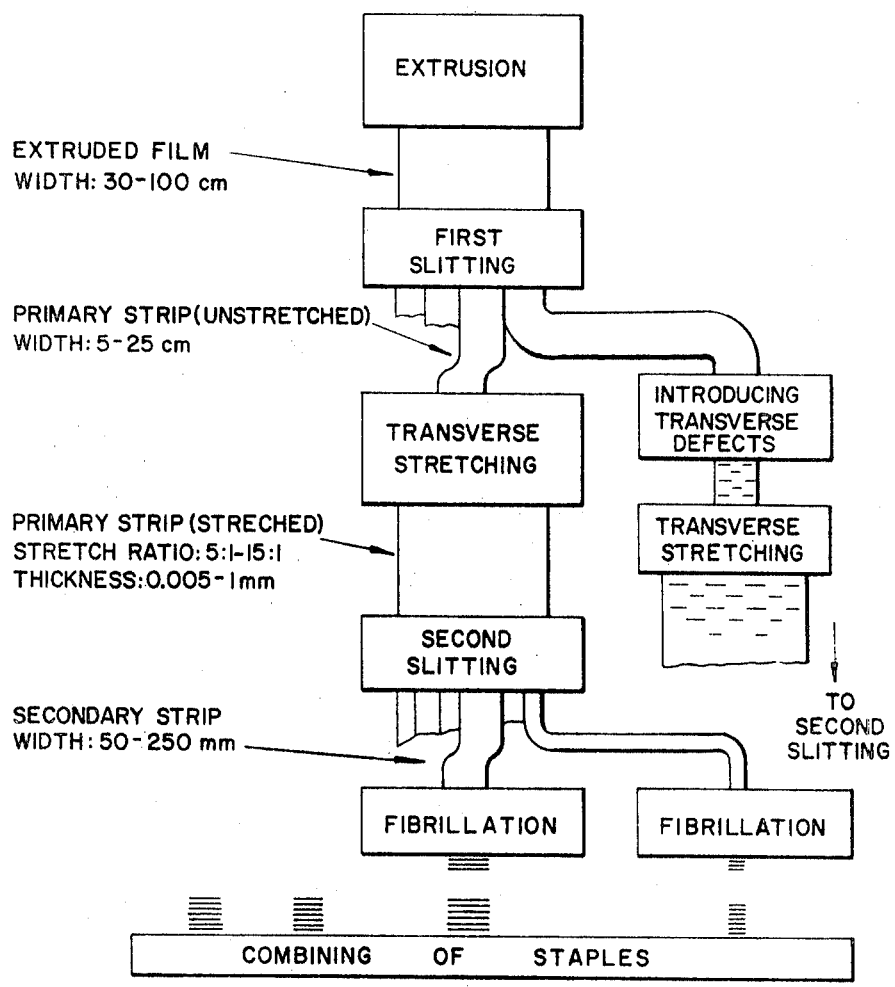
INVENTOR:
JOHAN M. GOPPEL
BY: Martin S. Baer
HIS ATTORNEY

United States Patent Office 3,470,595
Patented Oct. 7, 1969

3,470,595
PRODUCTION OF STAPLE FIBERS
Johan M. Goppel, Delft, Netherlands, assignor to Shell Oil Company, New York, N.Y., a corporation of Delaware
Filed July 28, 1967, Ser. No. 656,663
Claims priority, application Netherlands, July 29, 1966, 6610696
Int. Cl. D04h 17/00; D05c 15/00
U.S. Cl. 28—72                          8 Claims

ABSTRACT OF THE DISCLOSURE

Synthetic textile staple fibers of controllable distribution of lengths are produced by a process including the steps of stretching thermoplastic film such as polypropylene film, while moving as a continuous band, transversely to its direction of movement, cutting the stretched film into narrower secondary bands or strips extending longitudinally in the same direction as the primary band and varying in width in accordance with the desired distribution of staple length, and converting said secondary bands or strips into staple fibers by fibrillation, as in a carding machine.

---

This invention relates to a method for the production of staple synthetic fibers from oriented fibers of thermoplastics such as polypropylene.

It is known that films of thermoplastic polymers which have been molecularly oriented by stretching can easily be split in the direction of stretch. Use can be made of this property to split the films mechanically into filaments or narrow strips or ribbons, which may remain interconnected at some points. These filaments or narrow strips can be used in the manufacture of yarns, rope, strands, fabrics, felt and similar fibrous products.

In copending patent application Ser. No. 615,448 of Dekker et al., a method for the production of staple fiber is described in which use is likewise made of the easy splittability in the direction of stretch. In this method thermoplastic stretched film strips are cut into clippings transverse to the direction of stretch and these clippings are subsequently split into fibers. The length of the clippings determines the maximum length of the fibers.

This invention provides another process of producing staple fibers from films of thermoplastic polymers. According to this invention a primary band or strip of a thermoplastic polymer film is stretched in a direction transverse to the direction of movement of the film strip and is subsequently cut into secondary strips, the longitudinal direction of which coincides with the direction of movement, whereupon these secondary strips are finally split into fibers.

The invention is illustrated by the drawing in which the sole figure represents a schematic outline of the process steps in a preferred mode of practicing the invention. The illustrated introduction of transverse defects is an optional modification which may be carried out on each of the film strips prior to transverse stretching.

The direction of movement of the film strip will normally be the same as the longitudinal direction of the film.

The division into clippings, such as is effected in the process according to the above-mentioned patent application, is superfluous in the process according to the present invention.

The width of the secondary strips into which the film strip is cut determines the maximum length of the staple fibers. A large proportion of the fibrillated product, however, consists of fibers having a length much smaller than the width of the secondary strips. The ratio between the width of the secondary strips and the average fiber length depends on the intensity of the mechanical fibrillating operation.

The width of the secondary strips is chosen on the basis of the desired average fiber length, which depends on the application envisaged for the staple fiber. In general the width of the secondary strips will be between 50 and 250 mm., usually between 100 and 200 mm. With a secondary strip width of 150 mm. the length of most of the fibers will normally be between 30 and 60 mm.

What has been said above with respect to the width of the secondary strips and the average length of the fibers is true when all the secondary strips have the same width. It is also true when strips of mutually dissimilar width are cut from one and the same film strip. By simultaneously fibrillating secondary strips of dissimilar width it is possible to vary as desired the length distribution of the fibers in the product.

The secondary strips may be split into fibers in many ways, for example, by passing the secondary strips between friction rollers or over brushes, or by means of revolving pin-tables or beater mills. If the staple fiber has to be carded, the splitting into fibers can be combined with the carding process so that a separate splitting unit for the secondary strips is unnecessary.

The carding machines which are used can be of the types generally used. A carding machine normally comprises a rotating cylinder which cooperates with a number of similarly rotating rolls of smaller diameter, known as flats and combs. The cylinder and the rolls cooperating with it are provided with carding needles which cause the fibrillation of the secondary strips. The carding operation can be repeated, as desired, in order to increase the uniformity of the web. For this purpose a number of carding machines (in some cases 6 or more) are placed so that the web can successively pass through them in sequence.

The material split into fibers leaves the carding machine in the form of a uniformly composed web. This web can be used directly in the form of flocks as filling material, for example, for cushions, or can be twisted to slubbing, which is processed to yarn. This web can also be reinforced according to conventional methods, i.e., the loose fibers can be united with each other to form structures which find practical application as such and which are known as non-woven fabrics. The loose fibers can be interconnected by means of a brief heating, which softens the surface of the fibers and causes a bond to form at the points where these fibers come into contact with each other, which bond is retained during subsequent cooling. It is often easier to create the bond by adding a thermoplastic material having a lower softening point than the fibers. This latter thermoplastic material is preferably also used in the form of fibers. The reinforcement of the web coming from the carding machine can also be achieved by impregnating it with a solution of resinous material in a volatile solvent, which solvent is evaporated after impregnation.

The primary strips which in the present invention are stretched transversely to the direction of movement are normally obtained by extrusion from a long narrow orifice, which operation is normally followed by a division of the extruded film web into a number of parallel strips by cutting in the direction of movement. The width of the extruded film can be, for example, 30 to 100 cm. The width of the primary strips is usually between 5 and 25 cm. These primary strips are stretched in the transverse direction, with a stretching ratio which is normally between 5:1 and 15:1.

The transverse stretching can be effected by arranging clamps at regular intervals along both sides of the film strip, which clamps are moved in such a way that the distance between two clamps placed opposite each other, between which the width of film is situated, becomes steadily greater until the desired maximum width is reached. For this purpose the clamps may, for example, be passed through diverging guide means. The clamps on both sides of the film strip are preferably united by two endless chains, one on each side of the film strip. Instead of having fixed guide paths for the clamps, the divergence can also be obtained by passing chains, on which the clamps are mounted, over suitably positioned gear wheels.

The thickness of the film can vary considerably and is selected on the basis of the application envisaged for the staple fiber. The thickness of the stretched film is usually between 0.005 and 1 mm.

A film strip which is stretched is as a matter of course subject to some contraction in the dimensions perpendicular to the direction of stretching. If this contraction is suppressed there is in addition to the orientation in the direction of stretching also some orientation perpendicular thereto and the latter orientation might counteract the splitting and fibrillation in the direction of stretching.

In the process of the present invention the main orienation of the film is transversely to the direction of movement of the film. As normally there is no possibility for contraction in the direction of movement there is also some orientation in that direction.

In order to prevent the orientation in the direction of movement from counteracting the fibrillation, several measures can be taken either separately or in combinations:

(a) The film can be introduced in corrugated condition into the apparatus in which the transverse stretching is carried out. The tops of the waves or corrugations should make an angle with the direction of movement of the film and preferably be perpendicular thereto.

(b) The clamps arranged at each side of the film strip can be moved in such a way that successive clamps on either or both sides come nearer to each other as the distance between opposite clamps increases.

(c) Transverse defects, such as slits and/or scratches, can be provided in the film strip either before or simultaneously with the transverse stretching. The slits and/or scratches should preferably be arranged perpendicular to the direction of movement of the film. The transverse slits and scratches can be applied by contacting the film with rotating rolls on the surface of which teeth, pins, bristles or sandpaper are arranged. If the scratching is carried out on the film during movement of the latter, the axis of rotation of the scratching rolls can be suitably arranged at a sharp angle with the direction of movement of the film, the speed of rotation being so adapted to the speed of the film that the scratches are made in the desired direction.

If desired or required, the film strip, before being cut up into secondary strips, can be subjected to one or more special treatments such as stabilizing, finishing or crimping.

Stabilizing is a treatment whereby the stretched film strip is maintained at a somewhat elevated temperature for some time in order to reduce or eliminate local inhomogeneities, such as stress concentrations. This treatment is normally effected by passing the film strip through a tunnel, through which hot air is passed as well.

Finishing is a treatment whereby the film strip is passed through a bath in which the film is provided with a thin layer which suppresses the static charge of the film and affects the smoothness of the fiber surface in the desired manner.

In crimping the film strip may be mechanically corrugated or wrinkled, as a result of which the fullness of the staple fiber produced from this film increases.

The thermoplastic polymer from which the films are produced is preferably a polyolefin of at least 50% crystallinity, as determined from the density. Very suitable materials are polyethylene having a density of above 0.94 and polypropylene.

EXAMPLE I

The starting material used was a polypropylene having a limited viscosity number of 2.5, an isotacticity of 97% and a crystallinity of 63%. This polypropylene was extruded as a film having a width of 450 mm. and a thickness of 0.2 mm. The rate of extrusion was 15 meters per minute. After extrusion the film was cooled in a water bath.

The film was cut in the direction of movement into strips having a width of 110 mm. These films were clamped on both sides and passed into an oven, in which the clamps were moved by diverging guide means in such a way that the distance between two clamps placed opposite each other (between which the width of film was situated) was multiplied seven times. The stretching ratio was therefore 7:1. The distance covered by the strip in the oven was 5 meters. The residence time in the oven was 20 seconds. The temperature of the air in the oven was 150° C. As a result of the stretching the thickness of the film dropped to 0.03 mm.

The transversely stretched film strip was subsequently passed over knives and cut into secondary strips having a width of 150 mm. Each secondary strip was continuously passed to a carding machine where it was fibrillated. The fibers in the resulting web were substantially 30 to 60 mm. long.

EXAMPLE II

The procedure was that of Example I, except that the film strip was cut by the knives into 3 secondary strips with a width of 110 mm. and 2 secondary strips with a width of 210 mm. In this way a wider distribution of the fiber length was obtained, substantially between 20 and 85 mm.

EXAMPLE III

The starting material was a polyethylene having a density of 0.95, an I.V. (intrinsic viscosity) of 1.5 and a crystallinity of 87%.

From this polymer a film was produced which was treated in the same manner as described in Example I for the polypropylene film, the only difference being that the temperature of the air in the oven in which the stretching operation was carried out was 125° C. The result was identical with that of Example I.

I claim as my invention:
1. A process for the production of staple fibers of an oriented crystalline thermoplastic which comprises the steps of
 (a) stretching an unoriented moving strip of a film of said thermoplastic in the direction transverse to its direction of movement while maintaining the length of the strip which is undergoing said stretching at a value not in excess of its length prior to said stretching,
 (b) cutting the stretched film into secondary strips the longitudinal direction of which coincides with the direction of movement of said first strip, and 50–250 mm. in width, and
 (c) subjecting said secondary strips to a fibrillating treatment whereby they are broken into staple fibers having a maximum length no greater than the width of said secondary strips.

2. In the process according to claim 1, the step of introducing transverse defects into the film before completion of said transverse stretching.

3. A process according to claim 1 wherein said thermoplastic polymer is a polyolefin of at least 50% crystallinity.

4. A process according to claim 3 wherein the starting film is a polypropylene film of 0.005 to 1 mm. thickness.

5. The process according to claim 1 wherein said stretching is carried out at an elevated temperature.

6. The process according to claim 5 wherein said stretching is carried out at from 125–150° C.

7. A process for the production of staple fibers of an oriented crystalline thermoplastic which comprises the steps of
   (a) stretching an unoriented moving strip of a film of said thermoplastic in the direction transverse to its direction of movement while maintaining the length of the strip which is undergoing said stretching at a value not in excess of its length prior to said stretching,
   (b) cutting the stretched film into a multiplicity of secondary strips of unequal width, the longitudinal directional of which coincides with the direction of movement of said first strip, the distribution of widths of said secondary strips being selected to produce in a subsequent fibrillation treatment a mixture of staple fibers having a predetermined distribution of lengths,
   (c) subjecting said secondary strips simultaneously to fibrillating treatment whereby they are broken into staple fibers of unequal length, and
   (d) combining said staple fibers.

8. A process according to claim 7 wherein said secondary strips are 50–250 mm. wide.

References Cited

UNITED STATES PATENTS

| | | |
|---|---|---|
| 2,926,415 | 3/1960 | Griffin _____ 28—72 XR |
| 2,954,587 | 10/1960 | Rasmussen. |
| 2,980,982 | 4/1961 | Costa et al. |
| 3,123,854 | 3/1964 | Aykanian _____ 26—57 |
| 3,302,501 | 2/1967 | Greene. |
| 3,137,611 | 6/1964 | Krolik. |
| 3,336,174 | 8/1967 | Dyer et al. |

OTHER REFERENCES

Modern Textiles Magazine, pp. 29 and 30, "Yarns From Film Fibrillation," July 1967.

DORSEY NEWTON, Primary Examiner

U.S. Cl. X.R.

28—1